(12) United States Patent
Richter et al.

(10) Patent No.: US 12,122,259 B2
(45) Date of Patent: Oct. 22, 2024

(54) WARNING DEVICE FOR A CHARGING PROCESS FOR ELECTRIC VEHICLES

(71) Applicant: Volkswagen Aktiengesellschaft, Wolfsburg (DE)

(72) Inventors: Robin Richter, Gifhorn (DE); Sebastian Ehmann, Wolfenbüttel (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 563 days.

(21) Appl. No.: 17/374,645

(22) Filed: Jul. 13, 2021

(65) Prior Publication Data

US 2022/0024341 A1 Jan. 27, 2022

(30) Foreign Application Priority Data

Jul. 22, 2020 (DE) .......................... 102020209266.4

(51) Int. Cl.
| | |
|---|---|
| B60L 53/68 | (2019.01) |
| B60L 53/14 | (2019.01) |
| B60Q 1/52 | (2006.01) |
| B60Q 5/00 | (2006.01) |
| B60Q 9/00 | (2006.01) |
| G08B 7/06 | (2006.01) |
| G08B 21/18 | (2006.01) |
| H02J 7/00 | (2006.01) |

(52) U.S. Cl.
CPC ............... *B60L 53/68* (2019.02); *B60L 53/14* (2019.02); *B60Q 1/52* (2013.01); *B60Q 5/005* (2013.01); *B60Q 9/00* (2013.01); *G08B 7/06* (2013.01); *G08B 21/18* (2013.01); *H02J 7/0029* (2013.01)

(58) Field of Classification Search
None
See application file for complete search history.

(56) References Cited

U.S. PATENT DOCUMENTS

| | | | |
|---|---|---|---|
| 10,399,445 B2* | 9/2019 | Yellambalase | .......... B60L 53/16 |
| 2014/0214321 A1* | 7/2014 | Kawamata | ......... G01C 21/3476 |
| | | | 340/901 |
| 2018/0290551 A1 | 10/2018 | Jones et al. | |

FOREIGN PATENT DOCUMENTS

| | | |
|---|---|---|
| CA | 2801483 A1 | 7/2013 |
| DE | 102014216422 A1 | 2/2016 |
| DE | 102016011845 A1 | 4/2017 |
| DE | 102017200639 A1 | 7/2018 |
| DE | 102017111208 A1 | 11/2018 |

(Continued)

*Primary Examiner* — Tamara L Weber
(74) *Attorney, Agent, or Firm* — Peter Zura; LOZA & LOZA, LLP

(57) ABSTRACT

A warning system for warning pedestrians and other road users prior to a collision with a charging cable for an electric automobile. Charging cables run from a power source to a vehicle. The vehicle is charged using a charging cable. The vehicle being charged has the information that it is currently charging. It also has sensors that can identify the course of the cable, depending on the resolution and orientation of the sensors. This can be implemented using image processing algorithms or machine learning. The parked vehicle can also detect other road users by means of the onboard sensor system. If an impending collision between the road user and the charging cable is determined from these data, the road user is warned, using any of acoustic warning, or visual warning.

19 Claims, 4 Drawing Sheets

(56) References Cited

FOREIGN PATENT DOCUMENTS

| | | |
|---|---|---|
| EP | 3351422 B1 | 7/2018 |
| JP | 2012095495 A | 5/2012 |
| JP | 2014011877 A | 1/2014 |

* cited by examiner

WARNING DEVICE FOR A CHARGING PROCESS FOR ELECTRIC VEHICLES

CROSS REFERENCE TO RELATED APPLICATION

The present application claims priority to German Patent Application no. 10 2020 209 266.4, to Robin Richter et al., filed Jul. 22, 2020, the contents of which is incorporated by reference in their entirety herein.

TECHNICAL FIELD

The present disclosure relates to a device for providing a preemptive warning of a dangerous situation to a user during a charging procedure for an electric vehicle, a corresponding method, and an electric vehicle and a system.

BACKGROUND

Batteries, or rechargeable battery packs, for electric vehicles must be charged for the electric vehicle to be able to be driven. The charging can take place at public and/or private charging stations. Unlike refueling a motor vehicle with an internal combustion engine, the charging process for an electric vehicle may require more time. Furthermore, an electric vehicle can be charged not only at "gas stations," but also at other places. This normally takes place by induction, or using a charging cable. The charging cables are preferably connected directly to the power source, i.e. the charging station for an electric vehicle. During use, a third party, such as pedestrians, bicyclists, and/or other road users, may fail to visually see this charging cable. This endangers the health of the third party, who may trip over the charging cable, and become injured. This could also damage the charging cable, the electric vehicle, and/or the charging station.

EP 3 351 422 B1 relates to a device comprising a controller and a sensor coupled to the controller and configured to detect one or more parameters in numerous connection paths, wherein the numerous connection paths comprises numerous power sources and numerous electric loads. The device also comprises a selection unit controlled by the controller and configured to select one of the numerous paths in order to obtain power from one of the numerous power sources for an electrical consumer. This selection is made on the basis of the one or more parameters detected by the detection unit. The device also comprises a circuit breaker configured to impose a first amperage limit value for a first current flowing through a first connecting path, and a second amperage limit value for a second current flowing through a second connecting path. The disadvantage with this is that the disclosed teachings do not propose any means for preventing an accident caused by a charging cable running between a power source and an electric vehicle.

CA 280 1 483 A1 relates to a charging station for electric vehicles that has an image sensor that provides users with status information, e.g. whether the charging station is available, in use, damaged, or blocked by another vehicle. The image sensor can also be used to monitor the vehicle for security reasons during the charging process, and detect any manipulation of the vehicle or charging cable. The disadvantage with this is that it only provides protection for the electric vehicle that is being charged, and the charging cable. This does not protect a third party.

JP 2014 011 877 A relates to a charging system and a device for notifying a user of the status of a charging connection. A vehicle charging system comprises a vehicle and a charging device. The vehicle and/or the charging device comprise a proximity sensor for detecting how close the vehicle is to the charging device. The charging device has a status detection device that detects at least the state of a charging connector and a charging cable. The charging device also contains a notification device that informs the vehicle user when the proximity sensor has detected that the vehicle is close to the charging device on the basis of at least one state of the charging connector and/or the charging cable. This makes the charging process easier and more efficient for a user. It does not provide any protection for third parties.

SUMMARY

Aspects of the present disclosure are directed to preventing accidents that may be caused by charging an electric vehicle. In particular, such configurations should protect third parties, and prevent damage to charging cables, charging stations, and/or an electric vehicle.

In some examples, a device is disclosed for providing a preemptive warning to a third party, such as a third-party road user, of a dangerous environment during a charging process for a machine, such as an electric vehicle, comprising:
  an input interface for receiving sensor data including information regarding a charging cable for the electric vehicle and including information regarding the third-party road user;
  an analysis unit for determining an impending dangerous environment on the basis of the sensor data, and for generating a control command if there is the threat of a dangerous environment; and
  an output interface for transmitting the control command to a warning unit;
  wherein the sensor data comprises information regarding a position of the charging cable and a movement vector for the third-party road user; and wherein
  the control command results in a warning being output to the third-party road user, to warn the third party of an impending dangerous situation.

In some examples, a method is disclosed for providing a preemptive warning of a dangerous environment for a third-party road user during a charging process for an electric vehicle, comprising:
  receiving sensor data including information regarding a charging cable for the electric vehicle and including information regarding the third-party road user;
  determining a dangerous situation on the basis of the sensor data;
  generating a control command if there is the threat of a dangerous situation;
  transmitting the control command to a warning unit; and
  outputting a warning to the third-party road user to warn of an impending dangerous situation.

In some examples, an electric vehicle including a device, comprising:
  a sensor that comprises at least a top view camera, ultrasonic sensor, radar sensor, lidar sensor, and/or laser sensor,
  a warning unit configured to output an acoustic and/or visual warning, comprising at least a horn, an external loudspeaker, a lamp, a headlamp and/or warning light, or projector/laser for projecting a warning onto a surface in an electric vehicle's environment;
  a connection breaker configured to interrupt a charging process for the electric vehicle, wherein the connection breaker is preferably designed to release and/or disconnect the charging cable from the electric vehicle and/or the charging station.

In some examples, a system is disclosed comprising an electric vehicle as defined above, a charging cable, and a charging station, wherein the charging cable and/or the charging station include a warning unit, that may be in the form of lights and/or a loudspeaker.

A cost-effective device can be created with an interface that may be used with existing sensors built into an electric vehicle. An input interface can be hardwired and/or wireless, and preferably support one or more communication protocols. An impending dangerous situation can be reliably detected by an analysis unit.

BRIEF DESCRIPTION OF THE DRAWINGS

The present disclosure is explained below through exemplary embodiments in reference to the attached drawings. Therein:

FIG. 5a shows a schematic illustration of another operating environment during a charging process for an electric vehicle, in which the charging cable is plugged in;

DETAILED DESCRIPTION

Figure 1:
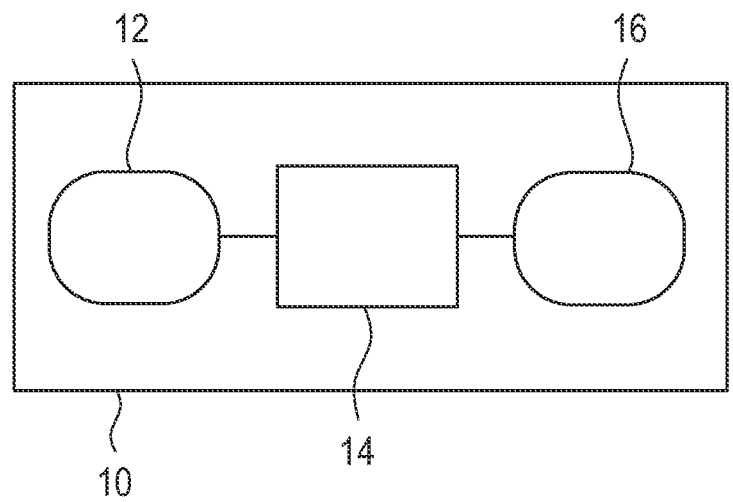
FIG. 1 shows a simplified schematic illustration of a device according to some aspects of the present disclosure.

In various examples disclosed herein, a third party road user can be detected in the vicinity of a charging cable on the basis of the sensor data, and the trajectory of the third party can be determined. The position of the charging station can also be determined on the basis of the sensor data. The course of the cable between the charging station and the charging connector or charging port for the electric vehicle can then be estimated. It should be understood that one or more regions can be defined around the course of the charging cable, for determining different danger levels. If the trajectory of the third party road user crosses one or more regions, the analysis unit can detect an impending dangerous situation. The electric vehicle preferably has sensors, such as top view cameras, that can detect the course of the charging cable, depending on the resolution and orientation of the sensors. The charging cable and/or the third party road user can be detected, e.g., by means of image processing algorithms or machine learning. An impending collision between the road user and the charging cable can be identified from this data, and the road user can be warned thereof, wherein the warning is output by the warning unit in response to a control command. The control command can be transmitted by an output interface using simple technology. The output interface can be hard-wired and/or wireless. In some examples, the output interface and the input interface can be combined, and contain a transceiver, for example.

The third party road user can be warned by means of the warning unit in the following ways:

acoustic warnings: warning sound, horn honking, speech output; and/or visual warnings: headlights, other warning lights, warning lights on the charging port/charging station, light in the charging cable, lighting of the charging cable, projections of light onto the ground, preferably using a laser.

It is particularly dangerous if an electric vehicle is charged at places not exclusively intended for charging an electric vehicle. On a footpath, for example, charging may take place via a device in a streetlight. A vehicle can also be charged via a charging station or via a socket in the wall of a building. Pedestrians and/or bicyclists are preferably warned, because these groups are at the greatest risk of becoming injured in a dangerous situation.

In some examples, the device is designed for installation in an electric vehicle, and is preferably part of an onboard computer, navigation system, and/or infotainment system. This makes it easier to install the device prior to delivery of the new vehicle, for example. It is also conceivable to retrofit an electric vehicle with the device, e.g., through reprogramming the onboard computer, navigation system and/or infotainment system.

In some examples, the input interface may be configured to receive sensor data from a sensor in the electric vehicle, wherein the sensor preferably includes at least a top view camera, ultrasonic sensor, radar sensor, and/or laser sensor, and the analysis unit is particularly preferably configured to determine the course of the charging cable by means of image processing algorithms and/or machine learning. As a result, a cost-effective device can be created that makes use of existing sensors. The device can be optimized in terms of costs and weight. It should be understood that this device can also contain one or more sensors. This also results in a device that provides reliable results over the course of a long service life.

In some examples, the output interface may be configured to transmit a control command to a warning unit in the electric vehicle, charging cable, and/or charging station, wherein the warning unit is configured to output an acoustic and/or visual warning, and preferably comprises at least a horn, external loudspeaker, lamp, in particular a headlight and/or warning light in the electric vehicle, and/or projection unit, in particular a laser for projecting a warning onto a surface in the electric vehicle's environment. This results in further improvements in the cost-effectiveness of the device, because the device can make use of existing warning units. It should be understood that this device can also contain one or more preferably specially designed warning units.

In some examples, a connection breaker may be configured to interrupt the charging process for the electric vehicle, wherein the control command results in an interruption of the charging process by means of the connection breaker. This further increases safety. In particular, this can prevent injury to persons and/or damage to the electric vehicle caused by the charging current.

In another example, the connection breaker may be configured to release and/or disconnect the charging cable from the electric vehicle and/or charging station, wherein the control command triggers a releasing and/or disconnecting of the charging cable by means of the connection breaker. This further increases safety. In particular, this can prevent injury to persons and/or damage to the electric vehicle, because damage to a charging port can be prevented by releasing or disconnecting the charging cable, and furthermore, the charging cable is less likely to trip someone.

In another example, the sensor data may include navigation data containing information regarding a position of the electric vehicle and/or charging station data containing information regarding a position of the charging station, wherein the charging station data can be obtained from the charging station via data transfer, querying a database, or by means of a tripmeter in mobile end devices, and/or other motion data for a passenger, and the analysis unit may be configured to determine a danger zone around the electric vehicle in which a dangerous situation is impending, preferably in the form of a collision with the charging cable, on the basis of the sensor data. The position of the charging cable can be estimated by this means in a cost-effective manner, using simple technology. This also results in particular in a device that can be retrofitted into a vehicle.

The various examples provided in this disclosure be advantageously combined with one another, if not otherwise specified.

A top view camera can show a view of the entire vehicle and its environment from a bird's eye view. A top view camera is preferably a circumferential camera system for vehicles, also known as a surround view system or 360° camera. This provides vehicle drivers with a 360° view obtained through the interaction of numerous video cameras. The visual monitoring system provides greater safety for the driver than purely acoustic systems, based entirely on ultrasonics.

An electric vehicle is preferably a transportation means powered by electricity. Electric vehicles are supplied with power in the form of electricity. This electricity is stored in traction batteries in the vehicle, or supplied externally from a permanent source, if necessary. An electric vehicle can also be a hybrid vehicle in the present case, in which the electric drive is combined with another drive, and the vehicle is also supplied with power from other sources. In principle, any vehicle that is at least partially powered with electricity is regarded as an electric vehicle in the context of the present disclosure.

A charging station is preferably configured as a charging station for electric vehicles and includes a charging station configured specifically for electric vehicles, which usually is designed along the lines of a gas pump for conventional fuel. Colloquially, such arrangements are referred to as an "electric pump," and is also referred to as a "charging point," wherein, by definition, only one vehicle can be connected to a charging point at a time.

Turning to FIG. 1, the drawing shows a device 10 for providing a preemptive warning of a dangerous situation to a third-party road user during a charging process for an electric vehicle, that includes an input interface 12, an analysis unit 14, and an output interface 16. It should be understood that the input interface 12 and the output interface 16 can also be combined in the manner of a transceiver. The separate depiction has been selected here for a better overview.

The input interface 12 may be configured to receive sensor data containing information regarding a charging cable for the electric vehicle and containing information regarding the third party road user. The sensor data can come from a sensor in the electric vehicle with which the device is used 10. It should be understood that the device 10 can also contain such a sensor. The sensor data may include information regarding the position of the charging cable and a motion vector for a third party road user.

The analysis unit 14 may be configured to determine an impending dangerous situation on the basis of the sensor data, and generate a control command, if a dangerous situation is impending. The analysis unit 14 can be a circuit, a logic circuitry, or a unit in the onboard electronics for an electric vehicle. By way of example, a dangerous situation can be detected if a movement vector for the third party road user were to cross the position and/or an environment surrounding the position of the charging cable.

The output interface 16 may be configured to transmit the control command to a warning unit. The warning unit can be a warning unit in the electric vehicle, e.g. a horn, external loudspeaker, and/or headlight in the electric vehicle. The control command results in the outputting of a warning to the third party road user by means of the warning unit, to warn this third party of an impending dangerous situation. The warning can comprise a flashing of the headlights, or an acoustic output from the horn and/or the external loudspeaker. It should be understood that the device 10 can also contain such a warning unit.

Figure 2:
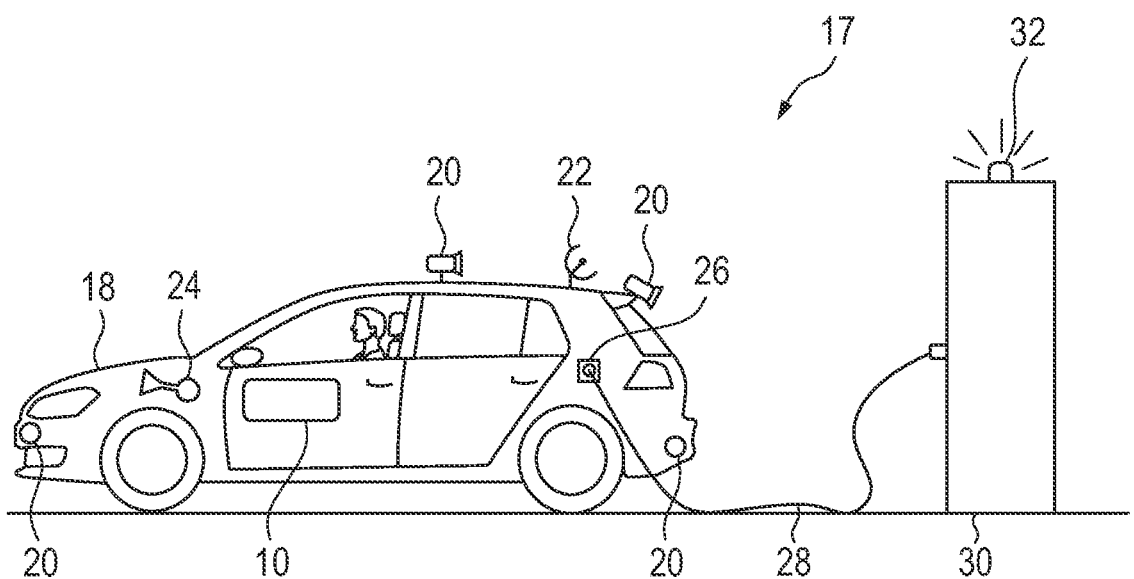
FIG. 2 shows a simplified schematic illustration of a system according to some aspects of the present disclosure.

FIG. 2 shows a system 17 comprising an electric vehicle 18. The electric vehicle 18 has numerous sensors 20, a communication unit 22, and a warning unit 24 in the form of a horn.

The electric vehicle 18 also has a charging port 26, and is connected by a charging cable 28 to a charging station 30. In this example, the charging station 30 has a lamp 32 that can also be used as a warning unit 24.

The system 17 in this example includes the electric vehicle 18, the charging cable 28, and the charging station 30. The sensors 20 in the electric vehicle 18 can include, e.g., a top view camera, ultrasonic sensor, radar sensor, lidar sensor, and/or laser sensor. In general, it is preferred that the sensors 20 in a driver assistance system are used, because this results in a cost-effective sensor system, in particular because there is no need for additional sensors 20. The communication unit 22 can also be regarded as a sensor 20 if data regarding the location of the electric vehicle 18 and/or the charging station can be obtained using the communication unit 22, in order to determine the course of the charging cable 28 from these data. It should be understood that information, in particular location information, can be exchanged between charging stations 30 and the device 10 by means of the charging cable 28.

By way of example, the direct connection between a charging station 30 and an electric vehicle 18 can serve as an approximation of the course of the charging cable 28. If a dangerous operating environment or situation is identified, a control command can be sent to the charging station 30 by means of the charging cable 28 or the communication unit 22, that results in a flashing of the lights 32 as a warning signal.

Figure 3:
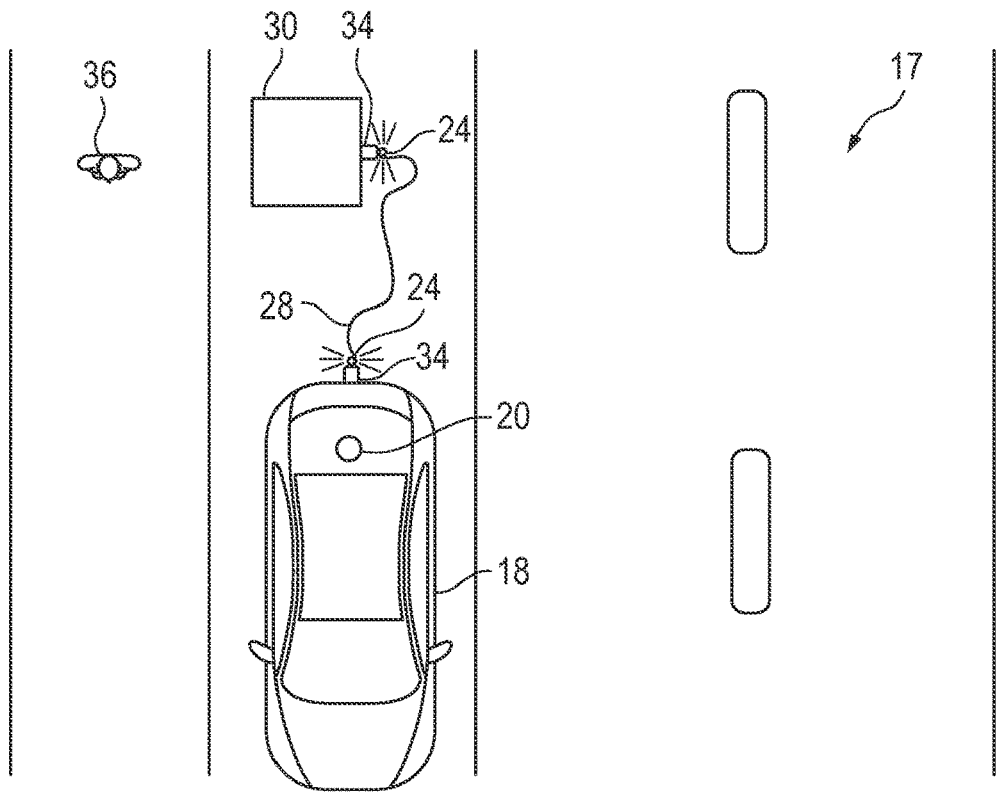
FIG. 3 shows a schematic illustration of an operating environment during a charging process for an electric vehicle.

An operating environment in which the electric vehicle 18 is charging is schematically illustrated in FIG. 3. The electric vehicle 18 may be in a parking space on the side of a roadway, not shown in greater detail. The charging station 30 may be behind the electric vehicle 18 in the direction of travel. The charging cable 28 may be connected to the charging station 30 and the electric vehicle 18 with male connectors, and runs between the rear of the electric vehicle 18 and the charging station 30. A third party road user 36 in the form of a pedestrian may be on a footpath next to the electric vehicle 18.

Starting from this situation, a dangerous operating environment can arise if the pedestrian intends to walk between the charging station 30 and the electric vehicle 18 on the roadway, to cross the road, for example. The pedestrian, and in particular a motion vector of the pedestrian, can be detected and determined by means of the sensors 20, as is known in principle from the prior art. It may be dangerous if this motion vector crosses an area between the rear of the electric vehicle 18 and the charging station 30. The analysis unit 14 in the device 10 identifies the dangerous operating environment and generates a control command based on this that results in the output of a warning by the warning unit 24. In this example, the warning unit 24 includes lights in the male connectors 34. If the pedestrian turns toward the roadway between the rear of the electric vehicle 18 and the charging station 30, the lights in the male connectors 34 can be used to inform the pedestrian of the charging process, and direct attention to the charging cable 28. A dangerous operating environment, such as tripping over the charging cable 28, can then be prevented in a preemptive fashion.

Figure 4:
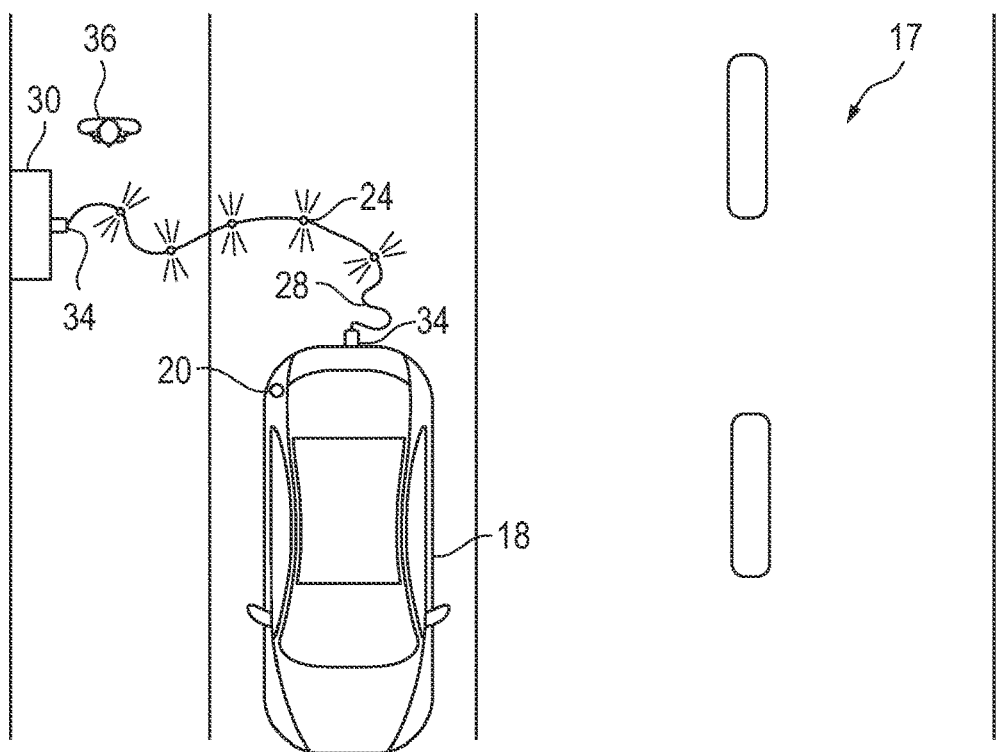
FIG. 4 shows a schematic illustration of another operating environment during a charging process for an electric vehicle.

Another operating environment of charging the electric vehicle 18 is schematically illustrated in FIG. 4. In differing from the situation shown in FIG. 3, the charging cable 28 runs between the wall of a building and the rear of the electric vehicle 18. The charging station 30 includes a charging device, referred to as a wall box here. The charging cable 28 also contains numerous warning units 24 in the form of lights in the charging cable 28. As a result, the visibility of the charging cable 28 may be significantly increased when a warning signal is output, i.e. when the lights are lit.

It should be understood that the form of the warning units 24 in FIGS. 3 and 4 may be only selected by way of example. It should also be understood that a combination of numerous warning units 24, e.g., horns, external loudspeakers, etc. can be used.

Figure 5A:
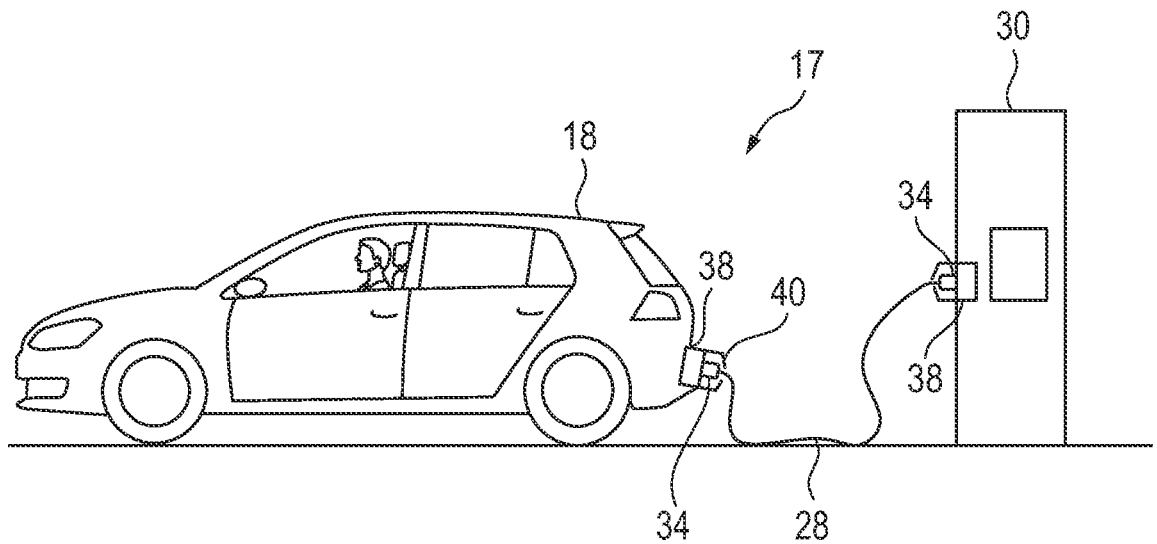

A schematic illustration of another operating environment is schematically illustrated in FIG. 5a in which the electric vehicle 18 is charging with a charging cable 28 connected thereto. In this example, the device 10, not shown, for purposes of clarity, also contains a connection breaker 38. The connection breaker 38 may be configured to interrupt the charging process for the electric vehicle 18. By way of example, the connection breaker 38 can receive a control command that results in an interruption of the charging process. This interruption of the charging process is understood to mean that transference of a charging current to the electric vehicle 18 by means of the charging cable 28 may be reduced and/or discontinued.

It should be understood that a warning can be output, as described above, and the interruption of the charging process first takes if the warning is inadequate, and the dangerous situation persists.

In this example, a male connector 34 on the charging cable 28 may be also coupled to the respective charging port 26 by means of mechanical retaining devices 40, and may be mechanically retained therein. The connection breaker 38 can be configured to actuate the mechanical retaining devices 40 and enable a disconnection or releasing of the male connectors 34, and therefore the charging cable 28.

Figure 5B:
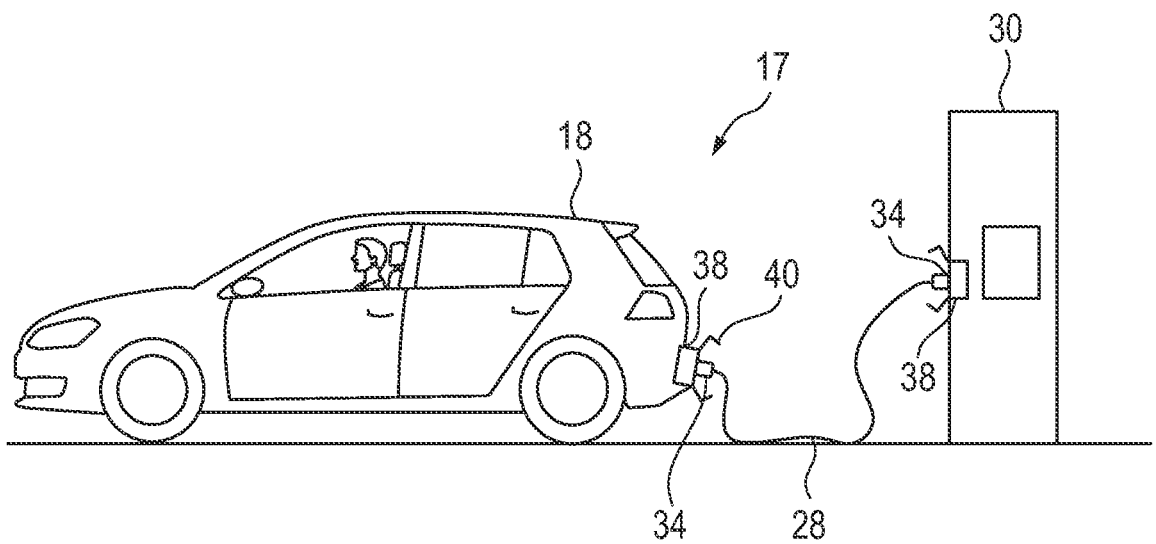
FIG. 5b shows a schematic illustration of another operating environment during a charging process for an electric vehicle, in which the charging cable is unplugged.

Another operating environment is schematically illustrated in FIG. 5b in which the electric vehicle 18 is being charged. In differing from the situation shown in FIG. 5a, the charging cable 28 may be disconnected. The retaining devices 40 are therefore open, such that the charging cable 28 may be released from one and/or both of the charging ports 26 if the charging cable 28 comes in contact with a third party road user 36. This reduces the risk of an accident.

Figure 6:
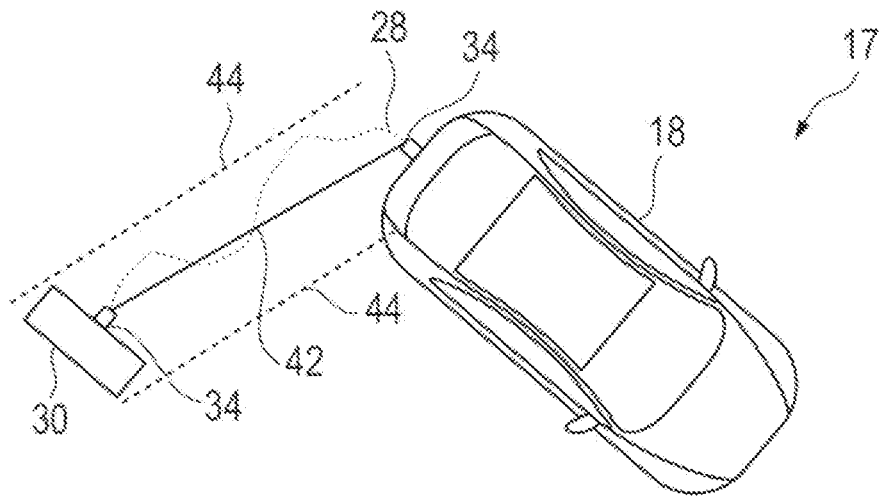
FIG. 6 shows a schematic illustration of determining the course of a charging cable during a charging process according to some aspects of the present disclosure.

The manner in which the course of a charging cable can be determined during a charging process is schematically illustrated in FIG. 6. For purposes of brevity, the device 10 and sensors 20, etc. are not shown.

The position of the charging cable 28 is indicated by a dotted line, and can be determined in a first estimation by the direct connection between the charging port 26 on the electric vehicle 18 and the charging port 26 on the charging station 20. This direct connection is indicated by the numeral 42. An area can be defined surrounding this direct connection 42, bordered by the two parallel broken lines 44, in order to determine a dangerous situation. If a third party ends up within this area, it can be assumed that this includes a dangerous situation. By way of example, a warning can be output if someone enters this area, as described above, and/or the charging process can be interrupted.

It should be understood that the area is preferably selected such that a third-party road user 36 has enough time to become aware of the warning signal and react to it. It should also be understood that numerous areas can be defined, and different measures can be assigned to the different areas.

By way of example, an additional warning can be output if the third-party road user 36 continues to move toward the charging cable 28. A very narrow area can also be defined in which a decoupling of the charging cable 28 and an interruption of the charging process take place. In general, more extreme measures can take place, if there may be a higher probability of danger.

It should be understood that an exact course of the charging cable 28 can also be determined by evaluating camera images and/or other sensor data.

Figure 7:
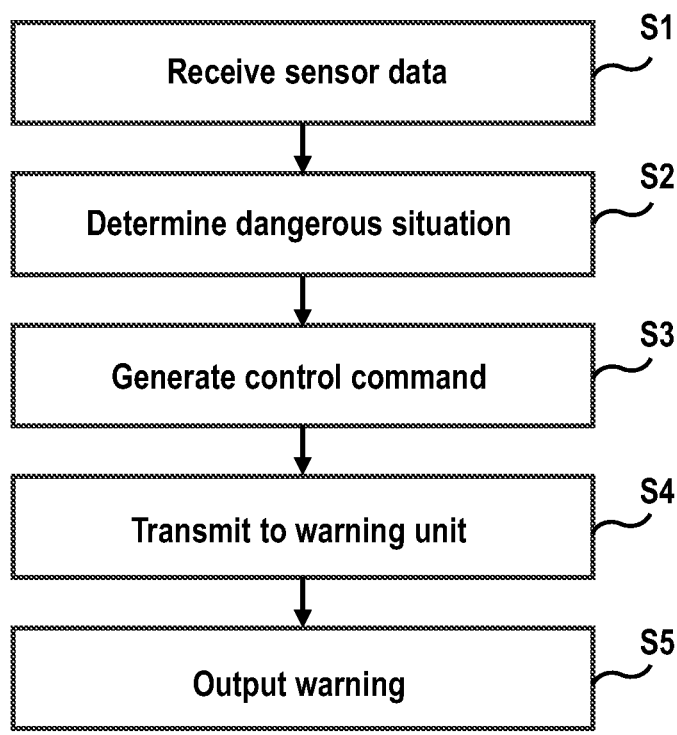
FIG. 7 shows a schematic illustration of method steps of a method according to some aspects of the present disclosure.

The steps of a method according to the invention for providing a preemptive warning of a dangerous situation to a third-party road user 36 during a charging process for an electric vehicle 18 are shown schematically in FIG. 7. Sensor data containing information regarding a charging cable 28 for the electric vehicle 18 and containing information regarding the third-party road user 36 are received in a first step S1. An impending dangerous situation may be subsequently determined in a second step S2 on the basis of the sensor data, preferably by means of the analysis unit 14, and a control command is generated in a third step S3, if there is the threat of a dangerous situation. The control command is sent to a warning unit 24 in a fourth step S4, and a warning is output to the third-party road user 36 in a fifth step S5.

It should be understood that the teachings disclosed herein can be advantageously used with all machines that are temporarily connected to a charging device via a charging cable, if the course of the cable can interfere with and/or endanger a third party, or the third party can damage the cable itself.

LIST OF REFERENCE SYMBOLS

10 device
12 input interface
14 analysis unit
16 output interface
17 system
18 electric vehicle
20 sensor
22 communication unit
24 warning unit
26 charging port
28 charging cable
30 charging station 32 light
34 male connector
36 third party road user
40 mechanical retaining device
42 direct connection
44 parallel broken lines
S1-S5 steps of the method

The invention claimed is:

1. A device for providing a preemptive warning of a dangerous operating environment during charging, comprising:
   an input interface for receiving sensor data comprising information on a position of a charging cable coupled to a charging port while receiving electrical power, and for receiving information regarding a motion vector for a third party indicating a direction of travel relative to the position of the charging cable;
   an analysis unit for determining a dangerous operating environment during receipt of electrical power, based on the sensor data determining the motion vector is in a directional position indicating impending contact with the charging cable, wherein the analysis unit is configured to generate a control command in response to the dangerous operating environment;
   an output interface, operatively coupled to the analysis unit for transmitting the control command to a connection breaker configured to interrupt the charging for the vehicle in response to the control command.

2. The device according to claim 1, wherein the device is configured as part of an onboard computer, navigation system and/or infotainment system of a vehicle.

3. The device according to claim 1, wherein the sensor data comprises data from at least one of a top view camera, ultrasonic sensor, radar sensor, lidar sensor, and/or laser sensor, and wherein the analysis unit is configured to determine a course of the charging cable using image processing and/or machine learning.

4. The device according to claim 1, wherein the audible warning comprises audio generated from a horn or loudspeaker, and the visual warning comprises visual indicia from one of a headlamp, and/or warning light on the electric vehicle, a projector, or a laser for projecting a warning onto a surface in an electric vehicle's environment.

5. The device according to claim 1, further comprising a warning unit to automatically generate at least one of an electrically generated audible and/or visual warning in response to the control command.

6. The device according to claim 5, wherein the connection breaker is configured to release and/or disconnect the charging cable from the vehicle in response to the control command.

7. The device according to claim 1, wherein the sensor data comprises information regarding a position of the vehicle, and position of a charging station.

8. The device according to claim 7, wherein the position of the charging station is received via a data transfer from the charging station, a data base query or a trip meter in a mobile end device.

9. A method for providing a preemptive warning of a dangerous operating environment during charging, comprising:
   receiving sensor data via an input interface, wherein the sensor data comprises information on a position of a charging cable coupled to a charging port while receiving electrical power, and information regarding a motion vector for a third party indicating a direction of travel relative to the position of the charging cable;
   determining, via an analysis unit, a dangerous operating environment during receipt of electrical power, based on the sensor data determining the motion vector is in a directional position indicating impending contact with the charging cable, wherein the analysis unit generates a control command in response to the dangerous operating environment; and
   transmitting, via the analysis unit, the control command to a connection breaker configured to interrupt the charging for the vehicle in response to the control command.

10. The method according to claim 9, wherein the sensor data comprises data from at least one of a top view camera, ultrasonic sensor, radar sensor, lidar sensor, and/or laser sensor, and wherein the analysis unit is configured to determine a course of the charging cable using image processing and/or machine learning.

11. The method according to claim 9, wherein the audible warning comprises audio generated from a horn or loudspeaker, and the visual warning comprises visual indicia from one of a headlamp, and/or warning light on the electric vehicle, a projector, or a laser for projecting a warning onto a surface in an electric vehicle's environment.

12. The method according to claim 9, further comprising interrupting, via a connection breaker, the charging for the vehicle, wherein the connection breaker is configured to interrupt the charging in response to the control command.

13. The method according to claim 12, further comprising automatically generating, via a warning unit, at least one of an electrically generated audible and/or visual warning in response to the control command.

14. The method according to claim 9, wherein the sensor data comprises information regarding a position of the vehicle, and position data of a charging station.

15. The method according to claim 14, wherein the position data of the charging station is received via a data transfer from the charging station, a data base query or a trip meter in a mobile end device.

16. A vehicle system for providing a preemptive warning of a dangerous operating environment during charging, comprising:
   a sensor system comprising at least one of a top view camera, ultrasonic sensor, radar sensor, lidar sensor, and/or laser sensor;
   an input interface for receiving sensor data from the sensor system, the sensor data comprising information on a position of a charging cable coupled to a charging port while receiving electrical power, and for receiving information regarding a motion vector for a third party indicating a direction of travel relative to the position of the charging cable;
   an analysis unit for determining a dangerous operating environment during receipt of electrical power, based on the sensor data determining the motion vector is in a directional position indicating impending contact with the charging cable, wherein the analysis unit is configured to generate a control command in response to the dangerous operating environment; and
   a connection breaker configured to interrupt a charging process for the vehicle when receiving the control command.

17. The vehicle system according to claim 16, further comprising an output interface, operatively coupled to the analysis unit for transmitting the control command to a warning unit to generate at least one of an audible and/or visual warning.

18. The vehicle system according to claim 17, wherein the audible warning comprises audio generated from a horn or loudspeaker, and the visual warning comprises visual indicia from one of a headlamp, and/or warning light on the electric vehicle, a projector, or a laser for projecting a warning onto a surface in an electric vehicle's environment.

19. The vehicle system according to claim 16, wherein the sensor data comprises information regarding a position of the vehicle, and position of a charging station.

* * * * *